United States Patent
Young

(10) Patent No.: US 6,457,090 B1
(45) Date of Patent: Sep. 24, 2002

(54) STRUCTURE AND METHOD FOR AUTOMATIC CONFIGURATION FOR SCSI SYNCHRONOUS DATA TRANSFERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/343,492

(22) Filed: Jun. 30, 1999

(51) Int. Cl.[7] .............................................. G06F 13/20
(52) U.S. Cl. ...................................................... 710/313
(58) Field of Search ................................ 710/305, 306, 710/311, 313

(56) References Cited

U.S. PATENT DOCUMENTS

| | | | | |
|---|---|---|---|---|
| 5,564,023 A | * | 10/1996 | Young | 710/100 |
| 5,732,223 A | * | 3/1998 | Moore et al. | 710/315 |
| 5,838,950 A | * | 11/1998 | Young et al. | 703/21 |
| 6,173,344 B1 | * | 1/2001 | Mohammed et al. | 710/62 |

* cited by examiner

*Primary Examiner*—Glenn A. Auve
(74) *Attorney, Agent, or Firm*—Gunnison, McKay & Hodgson, L.L.P.; Forrest E. Gunnison

(57) ABSTRACT

A parallel SCSI host adapter integrated circuit includes a memory containing a table having a plurality of entries. Each entry in the plurality of entries is a parameter used in a data transfer over a SCSI bus to a target device. A target identification register stores a pointer to the table. A SCSI transfer parameter register is coupled to the memory. An entry in the table pointed to by the value stored in the target identification register is loaded into the SCSI transfer parameter register. Another SCSI transfer parameter register also is coupled to the memory so that another entry stored in the table is loaded into the another SCSI transfer parameter register. A decoder circuit connected to the a SCSI transfer parameter register has a set SCSI attention signal output line, an enable SCSI asynchronous transfer output line, and a reset SCSI attention signal output line. When a value in the SCSI transfer register indicates an asynchronous data transfer, the decoder circuit generates an active signal on the enable SCSI asynchronous transfer output line. When a value in the SCSI transfer register indicates an asynchronous data transfer, and a value in the another SCSI transfer register indicates that a synchronous negotiation,is needed, the decoder generates an active signal on the set SCSI attention signal output line.

18 Claims, 7 Drawing Sheets

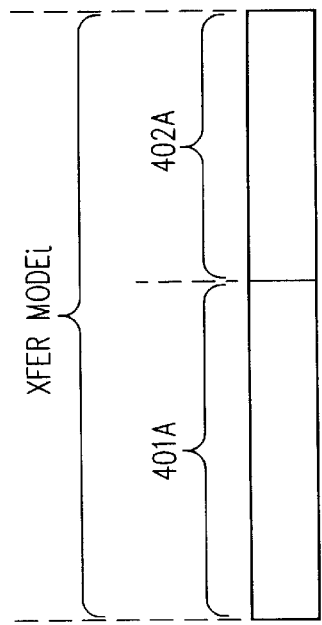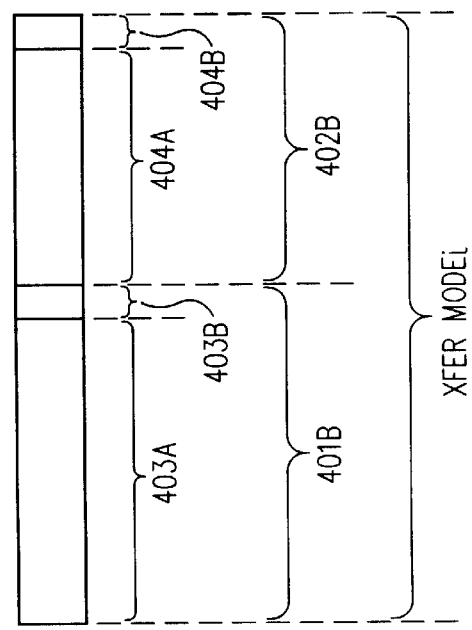
FIG. 4A
FIG. 4B

STRUCTURE AND METHOD FOR AUTOMATIC CONFIGURATION FOR SCSI SYNCHRONOUS DATA TRANSFERS

BACKGROUND OF THE INVENTION

1. Field of the Invention

This invention relates generally to data transfers over a SCSI bus, and in particular to automated synchronous data transfers over a SCSI bus.

2. Description of Related Art

Prior single chip parallel SCSI host adapters have included a plurality of modules and an on-chip processor that controlled operation of the modules. For example, see U.S. Pat. No. 5,659,690, entitled "Programmably Configurable Host Adapter Integrated Circuit Including a RISC Processor," issued on Aug. 19, 1997 to Stuber et al., which is incorporated herein by reference.

A typical parallel SCSI host adapter 100 included a SCSI module 130 (FIG. 1), a sequencer 120, data FIFO memory circuit 160, a memory 140, and a host interface module 110 that were interconnected by an internal chip I/O bus CIOBUS, which was used for control of host adapter integrated circuit 100 both by a host microprocessor 170 through a host adapter driver 165 and by sequencer 120. The combination of host adapter driver 165, sequencer 120, and SCSI module 130 were used for controlling both synchronous and asynchronous transfers over SCSI bus 150

As is known to those of skill in the art, information transfers over SCSI bus 150 use a handshake method that utilizes request signals REQs and acknowledge signals ACKs. SCSI command, message, and status phases utilize only the asynchronous transfer mode in which an acknowledge signal ACK cannot be asserted until after a request signal REQ is asserted; request signal REQ cannot be de-asserted until acknowledge signal ACK is asserted; and acknowledge signal ACK cannot be de-asserted until signal REQ is re-asserted.

Synchronous data transfers are faster than asynchronous data transfers because the overhead is reduced. The SCSI data phase is the only phase that can transfer data using either a synchronous data transfer mode or an asynchronous data transfer mode. The synchronous data transfer mode is optional for the data phase, and must be negotiated between an initiator, e.g., host adapter 100, and a target device, e.g., any one of SCSI peripherals 151 and 152.

In the negotiation between initiator 100 and the target device, two parameters are determined, a transfer period and a REQ/ACK offset. The transfer period is the minimum time period from a rising edge of one request signal to the rising edge of the next request signal, and also is the minimum time period from a rising edge of one acknowledge signal to the rising edge of the next acknowledge signal. The width of the transfer period dictates the speed at which data can be transferred over SCSI bus 150. The REQ/ACK offset is a maximum number of request signals REQs that a target device can send over SCSI bus 150 before an acknowledge signal ACK is received from host adapter.

Since the transfer period and REQ/ACK offset are dependent upon characteristics of the target device, they can be different for each target device 151, 152 on SCSI bus 150. While FIG. 1 illustrates only two target devices, typically SCSI bus 150 can have up to sixteen target devices.

When host adapter 100 selects a target device, or is reselected by a target device, SCSI module 130 must be configured with the transfer period and the REQ/ACK offset for that target device. Typically, host adapter driver 165 provides the transfer period and the REQ/ACK offset in a sequencer control block (SCB) for the target device. Sequencer 120 transfers the transfer period and the REQ/ACK offset from the SCB for the selected or reselecting target device to a SCSI rate register and a SCSI offset register, respectively, in SCSI module 130 to configure SCSI module 130 for the data transfer.

This explanation of configuring SCSI module 130 assumed that host adapter driver had the REQ/ACK offset and the transfer period for the target device stored in a table in the host computer memory. However, initially the values of these parameters for a particular target device an unknown and must be determined by negotiation. The negotiation is done during the execution of a SCSI command specified in the SCB.

Host adapter driver 165 that manages host adapter 100 notifies sequencer 120 that a negotiation is required by loading an invalid transfer period in the SCB that is sent to host adapter 100. During execution of the SCB, sequencer 120 detects the invalid transfer period. Those of skill in the art will appreciate that sequencer 120 is a processor that executes instructions. Thus, when it is stated that sequencer 120 takes a particular action this means that an instruction or sequence of instructions executed by sequencer 120 configures sequencer 120 so that the action is performed.

Upon detection of the invalid transfer period, sequencer 120 causes SCSI module 130 to assert the SCSI attention signal at the appropriate time during execution of the SCSI command according to the SCSI protocol, i.e., sequencer 120 programs the hardware so that the SCSI attention signal can be generated. The target device can respond to the SCSI attention signal either by entering a Message Out phase, or by ignoring the SCSI attention signal and entering a Command phase. If the SCSI attention signal is ignored, sequencer 120 continues with execution of the SCB by configuring SCSI module 130 for an asynchronous data transfer.

However, if the target device responds by entering the Message Out phase, sequencer 120 interrupts host adapter driver 165 with a request to execute the negotiation. Execution of the SCB by sequencer 120 is stopped for the negotiation because neither the transfer period nor the REQ/ACK offset is available to sequencer 120.

In response to the interrupt, host adapter driver 165 conducts the negotiation to determine the values for the two parameters. When the negotiation is completed, host adapter driver 165 saves the values for the two parameters in a table within the host computer memory for future use. Host adapter driver 165 also loads the values in the SCB currently being executed by sequencer 120, and into the appropriate registers in SCSI module 130. Finally, host adapter driver 165 releases sequencer 120 so that execution of the SCB can continue. Hence, all the operations associated with configuring SCSI module 120 for a synchronous transfer are performed by sequencer 120 and host adapter driver 165. The simple transfer of the transfer period and the REQ/ACK offset from the SCB to the appropriate registers required several sequencer instructions.

SUMMARY OF THE INVENTION

According to the principles of this invention, automating the setup of the data transfers enhances a data transfer during a SCSI data phase. Unlike the prior art host adapters that required a plurality of sequencer operations to configure the prior art SCSI module with the synchronous data transfer parameters, a SCSI module of this invention automatically configures the synchronous data transfer parameters using only hardware within the SCSI module of a parallel SCSI host adapter integrated circuit. The automatic configuration of the synchronous data transfer parameters eliminates the sequence of sequencer firmware instructions that were previously required to perform these operations as well as the time required to execute those firmware instructions.

In one embodiment, a parallel SCSI host adapter integrated circuit includes a memory containing a table having a plurality of entries. Each entry in the plurality of entries is a parameter used to configure the parallel SCSI host adapter integrated circuit for a data transfer over a SCSI bus to a target device. A target identification register stores a pointer to the table. A SCSI transfer parameter register is coupled to the memory. An entry in the plurality of entries pointed to by the value stored in the target identification register is loaded automatically into the SCSI transfer parameter register when a target identification (ID) is loaded into the target identification register.

Another SCSI transfer parameter register also is coupled to the memory so that another entry in the plurality of entries pointed to by the value stored in the target identification register is loaded automatically into the another SCSI transfer parameter register when the target ID is loaded into the target identification register.

A decoder circuit connected to the SCSI transfer parameter register has a set SCSI attention signal output line, an enable SCSI asynchronous transfer output line, and a reset SCSI attention signal output line. When a value in the SCSI transfer register indicates an asynchronous data transfer, the decoder circuit generates an active signal on the enable SCSI asynchronous transfer output line.

When a value in the SCSI transfer register indicates an asynchronous data transfer, and a value in the another SCSI transfer register indicates that a synchronous negotiation is needed, the decoder generates an active signal on the set SCSI attention signal output line. If the target device generates an active request signal followed by a command phase on the SCSI bus, the decoder drops the active signal on the set SCSI attention signal output line, and generates active signals on the reset SCSI attention signal output line and the enable SCSI asynchronous transfer output line.

The SCSI module of this invention includes a table that includes an entry for each target device on the SCSI bus. The entry specifies the mode of data transfer over the SCSI bus, either an asynchronous transfer or a synchronous transfer. If a synchronous transfer is specified, the table automatically provides a synchronous REQ/ACK offset and a synchronous transfer period from an on-chip table upon a target identification register being loaded with a target ID. If the entry indicates an asynchronous data transfer and another entry indicates that a synchronous negotiation is needed, the decoder automatically asserts a set SCSI attention signal.

All of these operations are performed automatically without the use of any processor, e.g., either the on-chip sequencer or the host computer processor. Consequently, both processors can perform other operations at the same time that the SCSI module of this invention automatically configures the parameters for the data transfer. In addition, the sequence of instructions that the on-chip sequencer used in the prior art to configure the parameters for the data transfer can be eliminated. Both of those factors improve the performance of the parallel SCSI host adapter integrated circuit that includes this invention relative to the prior art parallel SCSI host adapter integrated circuit.

BRIEF DESCRIPTION OF THE DRAWINGS

FIG. 4A is a first embodiment of a row in the SCSI data transfer parameter table of this invention.

FIG. 4B is a second embodiment of a row in the SCSI data transfer parameter table of this invention.

In the following description, elements with the same reference numeral are the same or equivalent elements.

DETAILED DESCRIPTION OF THE INVENTION

Figure 1:
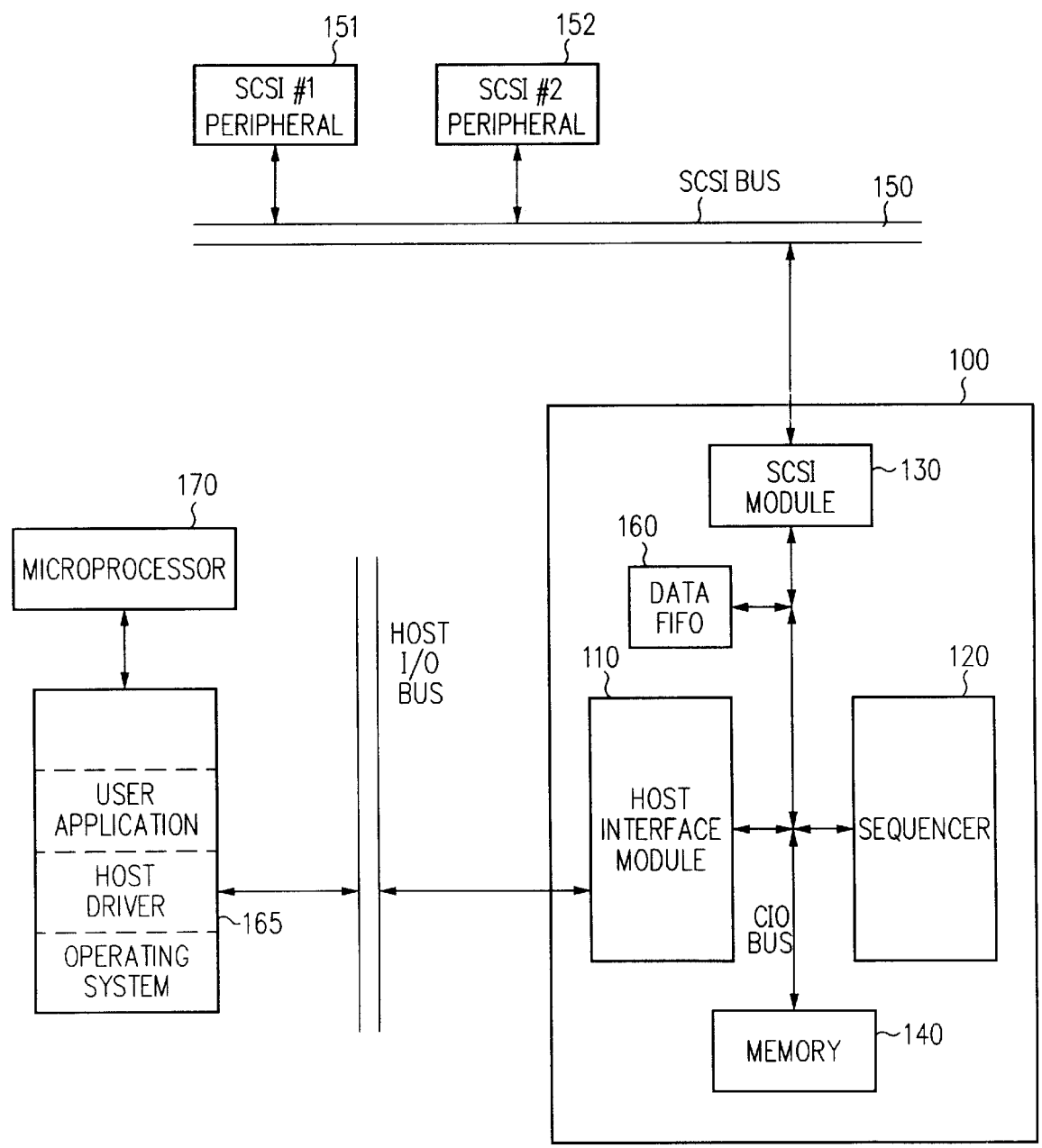
FIG. 1 is a block diagram of a prior art host adapter integrated circuit.
Figure 2:
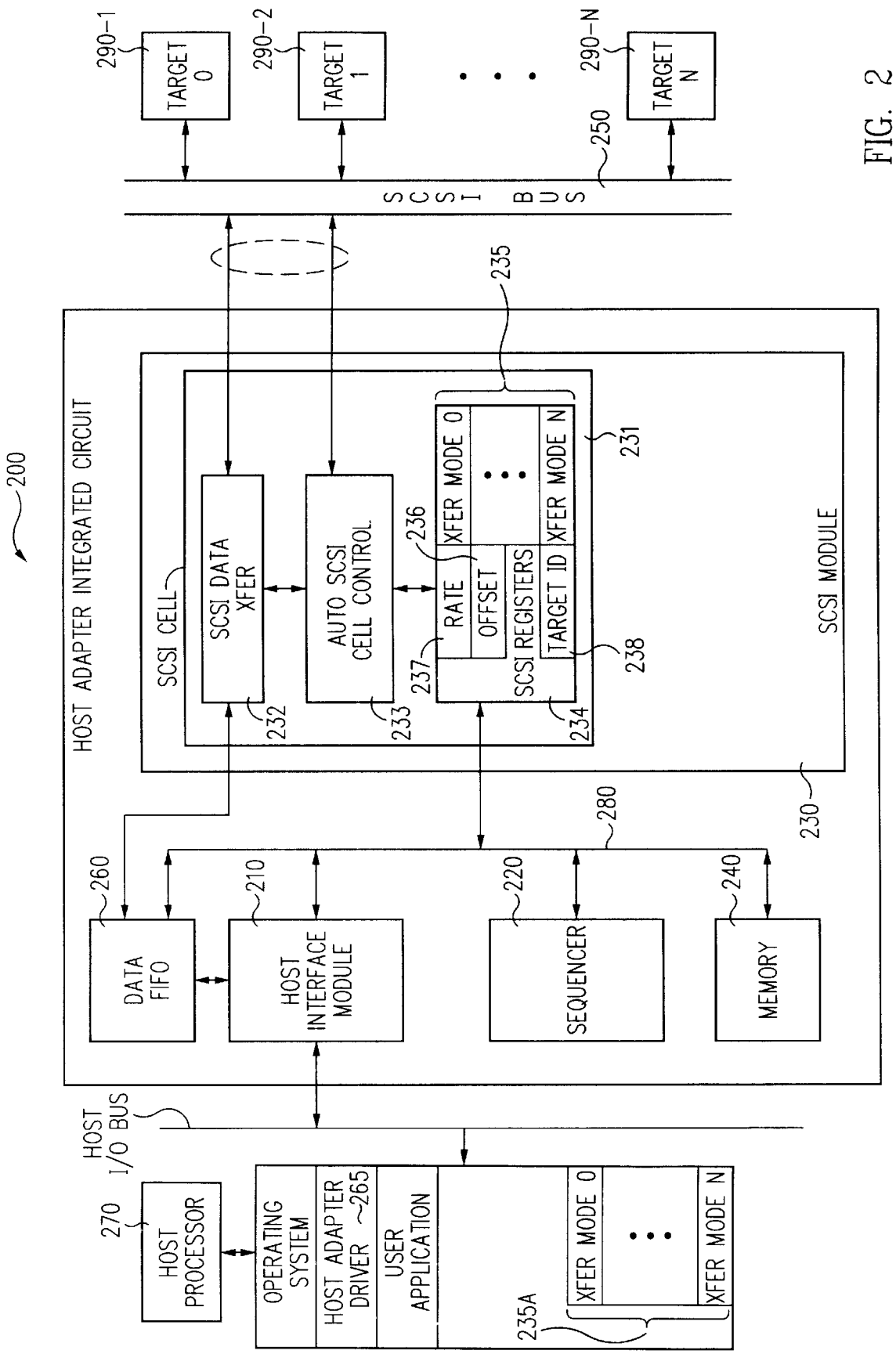
FIG. 2 is a block diagram of a parallel SCSI host adapter integrated circuit with a SCSI data transfer parameter table coupled to a target ID register, a rate register and a transfer register.

According to the principles of this invention, the data transfers during SCSI data phases are enhanced by automating the setup of the data transfers. Unlike the prior art host adapters that required a plurality of sequencer operations to configure the prior art SCSI module with the synchronous data transfer parameters, SCSI module 230 of this invention automatically configures the synchronous data transfer parameters using only hardware within SCSI module 230.

The automatic configuration of the synchronous data transfer parameters eliminates the sequence of sequencer firmware instructions that were previously required to perform these operations as well as the time required to execute those firmware instructions. Consequently, sequencer 220 has additional time available to perform other operations, and there is additional storage space for firmware instructions. Both of those factors are important in pushing the performance of host adapter integrated circuit 200 to higher levels.

According to the principles of this invention, a SCSI data transfer parameter table 235 is stored in a memory that, in this embodiment, is SCSI registers 234 in SCSI cell 231 within a SCSI module 230 in parallel SCSI host adapter integrated circuit 200. Data and information are passed within host adapter integrated circuit using an internal chip I/O bus 280.

Parallel SCSI host adapter integrated circuit 200 also includes a data FIFO 260, a host interface module 210, and a memory 240. Each of these elements and internal bus 280 are known to those of skill in the art, because they are similar to prior art elements, with the exceptions described herein. See for example commonly assigned U.S. Pat. No. 5,659,690, entitled "Programmably Configurable Host Adapter Integrated Circuit Including a RISC Processor," issued on Aug. 19, 1997 to Stuber et al., and commonly assigned U.S. Pat. No. 5,838,950, entitled "Method of Operation of a Host Adapter Integrated Circuit," issued on Nov. 17, 1998 to B. Arlen Young et al., each of which is incorporated herein by reference.

According to the principles of this invention, SCSI data transfer parameter table 235 includes a plurality of entries, e.g., two entries for each target device 290_1 to 290_N on SCSI bus 250. In this embodiment, each row XFERMODEi, where i goes from zero to N, of table 235 includes a SCSI offset entry and a SCSI rate entry for a corresponding target device 290_i.

A SCSI offset entry in table 235 specifies either an asynchronous transfer or a synchronous transfer period. In one embodiment, if the SCSI offset entry has a value of zero, an asynchronous transfer is specified. If the SCSI offset entry has a value greater than zero, a synchronous transfer is specified that uses the SCSI offset entry as the SCSI REQ/ACK offset.

In one embodiment, when the SCSI offset entry in table 235 indicates an asynchronous transfer, a SCSI rate entry specifies either that negotiation with the target device is required or that negotiation with the target device is completed. In another embodiment, when the SCSI offset entry in table 235 indicates an asynchronous transfer, the SCSI rate entry is not used. When the SCSI offset entry in table 235 indicates a synchronous transfer, the SCSI rate entry specifies a transfer period.

Hence, the automatic SCSI operations performed by SCSI cell 231 over SCSI bus 250 depend upon the values loaded automatically in registers 236 and 237 without any processor intervention. Table 1 presents one embodiment of possible configurations for registers 236 and 237 and the operations performed by SCSI cell 231 for each of the configurations, as described above.

TABLE 1

Configurations for Registers 236 and 237

| | SCSI offset Register 236 | SCSI rate Register 237 | Action |
|---|---|---|---|
| 1. | Asynchronous | Initiate Syn. Negotiation | Automatic assertion of SCSI Attention Signal |
| 2. | Asynchronous | Syn. Negotiation Completed | Perform Asynchronous transfer |
| 3. | Synchronous Offset | Synchronous Transfer Period | Perform Synchronous transfer using the specified offset and transfer period |

The particular values loaded in registers 236 and 237 are dependent upon host adapter 200, SCSI bus 250 and the particular target device selected or reselected. Of course, at least one of the values associated with the asynchronous operations should not be a valid synchronous transfer parameter.

When a target selection or reselection is completed by SCSI module 230, identification for the target device is loaded in target ID register 238. The loading of the target ID register is known to those of skill in the art. See for example. See for example, U.S. Pat. No. 5,838,950, entitled "Method of Operation of a Host Adapter Integrated Circuit," issued on Nov. 17, 1998 to B. Arlen Young et al., which is incorporated herein by reference.

The value in target ID register 238 is a pointer to a row in table 235. The SCSI offset entry and the SCSI rate entry in the row pointed to by the value in target ID register 238 are automatically loaded into a SCSI offset register 236, a first SCSI transfer parameter register, and a SCSI rate register 237, a second SCSI transfer parameter register. Following automatic loading of the values into registers 237 and 236, SCSI cell 231 automatically performs the operations necessary to complete the indicated transfer, or automatically initiates operations so that the necessary operations are performed.

Figure 3:
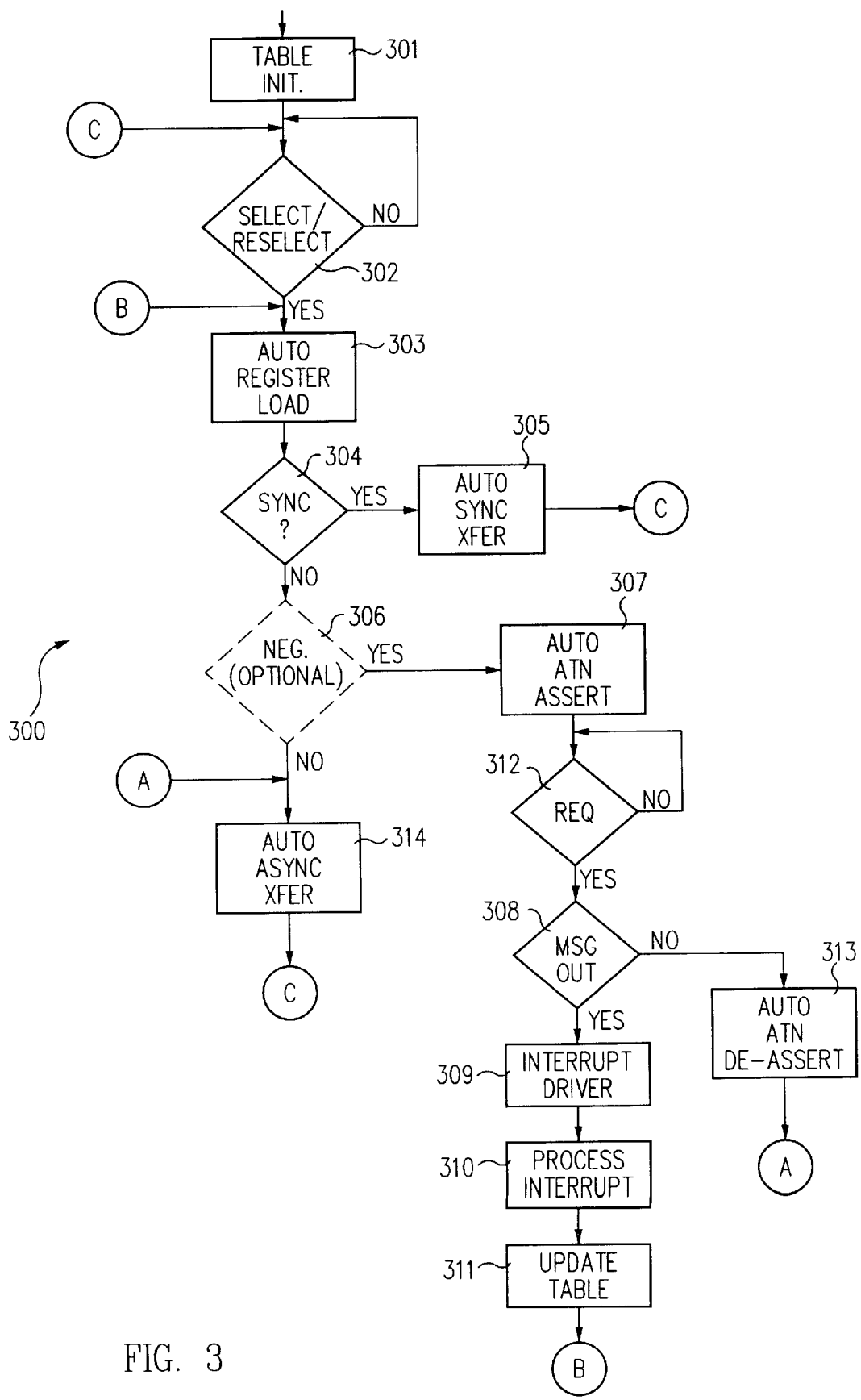
FIG. 3 is a process flow diagram that includes operations performed by the automated hardware of this invention.

FIG. 3 is a process flow diagram of the operations performed by hardware within automatic SCSI cell control block 233 using SCSI data transfer parameter table 235 in SCSI registers 234. A host adapter driver 265 that executes on a host processor 270 in a host computer performs table initialization operation 301. In operation 301, host adapter driver 165 initializes each entry in SCSI data transfer parameter table 235, using the host I/O bus and the appropriate modules within host adapter 200. Initialization of registers in a host adapter by a software driver executing on a host computer is well known to those of skill in the art, and so is not considered further. See for example, U.S. Pat. No. 5,838,950, entitled "Method of Operation of a Host Adapter Integrated Circuit," issued on Nov. 17, 1998 to B. Arlen Young et al., which is incorporated herein by reference in its entirety. One entry XFERMODEi in table 235 is initialized for each target device on SCSI bus 250.

The operations performed in initialization operation 301 depend on the structure of entry XFERMODEi in table 235. In a first embodiment illustrated in FIG. 4A, entry XFERMODEi has two fields 401A and 402A. First field 401A, a SCSI offset entry, is initialized to an invalid synchronous REQ/ACK offset, e.g., zero, and if second field 402A is used, second field 402A, a SCSI rate entry, is initialized to a value that is recognized as an invalid SCSI synchronous transfer period, e.g., a maximum value.

In a second embodiment illustrated in FIG. 4B, entry XFERMODEi has two fields 401B and 402B that in turn each have two sub-fields 403A, 403B and 404A, 404B, respectively. First sub-field 403A of field 401B is a synchronous REQ/ACK offset field, and so can be either left uninitialized or initialized to any desired value. Second sub-field 403B of field 401B is an asynchronous transfer flag bit and is set to indicate an asynchronous transfer. First sub-field 404A of field 402B is a synchronous rate field, and so can be either left uninitialized or initialized to any desired value. Second sub-field 404B of field 402B is a synchronous negotiation flag bit and is set to indicate that a synchronous negotiation is needed, and is reset otherwise.

In a second embodiment illustrated in FIG. 4B, entry XFERMODEi has two fields 401B and 402B that in turn each have two sub-fields 403A, 403B and 404A, 404B, respectively. First sub-field 403A of field 401B is a synchronous REQ/ACK offset field, and so can be either left uninitialized or initialized to any desired value. Second sub-field 403B of field 401B is an asynchronous transfer flag bit and is set to indicate an asynchronous transfer. First sub-field 404A of field 402B is a synchronous rate field, and so can be either left uninitialized or initialized to any desired value. Second sub-field 404B of field 402B is a synchronous negotiation flag bit and is set to indicate that a synchronous negotiation is needed, and is reset otherwise.

In one embodiment, table 235 includes sixteen entries. Host adapter driver 265 also creates a mirror image of table 235, i.e., mirror SCSI data transfer parameter table 235A, in a host computer memory.

After table initialization operation 301, the automatic hardware of this invention is idle until a selection or reselection occurs. This is represented in Figure 3 by select/reselect check operation 302. If a selection or reselection occurs, processing transfers to automatic register load operation 303, and otherwise re-performs operation 302.

The occurrence of a selection or a reselection means that a target identification is loaded in target ID register 238, and so processing transfers to automatic register load operation 303. As explained above, the value in target ID register 238 drives a target ID pointer 510 (FIG. 5) that selects one entry, i.e., one row XFERMODEi, of table 235. In response to row XFERMODEi being selected, first field 501A is automatically loaded into SCSI offset register 236, and second field 501B is automatically loaded into SCSI rate register 237. The particular type of memory used to store table 235 and the mechanism used to load registers 236 and 237 are not essential to this invention. Any type of memory can be used that can be addressed by a value stored in a register, and the values in the addressed location automatically written to another location.

When registers 236 and 237 are loaded, a decoder circuit 520 determines whether a valid SCSI synchronous REQ/ACK offset is stored in SCSI offset register 236. If SCSI offset register 236 contains a valid SCSI synchronous REQ/ACK offset value, decoder circuit 520 drives an active signal on enable SCSI synchronous transfer line 522 and an inactive signal on all other output lines of decoder circuit 520.

In response to the active signal on enable SCSI synchronous transfer line 522, automatic synchronous data transfer operation 305 is performed by SCSI cell 231 using the SCSI synchronous REQ/ACK offset in register 236 and the SCSI synchronous transfer period in register 237. The hardware necessary to perform an automated synchronous data transfer following configuration of the hardware is known to those of skill in the art and so is not considered further. See for example, U.S. Pat. No. 5,838,950. Upon completion of the synchronous data transfer, processing returns to select/reselect check operation 302.

If SCSI offset register 236 does not contain a valid SCSI synchronous REQ/ACK offset value, the hardware automatically transfers to negotiation check operation 306. If data in SCSI offset register 236 indicates an asynchronous transfer and the data in SCSI rate register 237 indicates a synchronous negotiation is required, negotiation check operation transfers to automatic attention assertion operation 307 in which a signal is generated that causes SCSI cell 231 to automatically generate an active signal on the attention line within the SCSI bus control lines CNTL.

Figure 5:
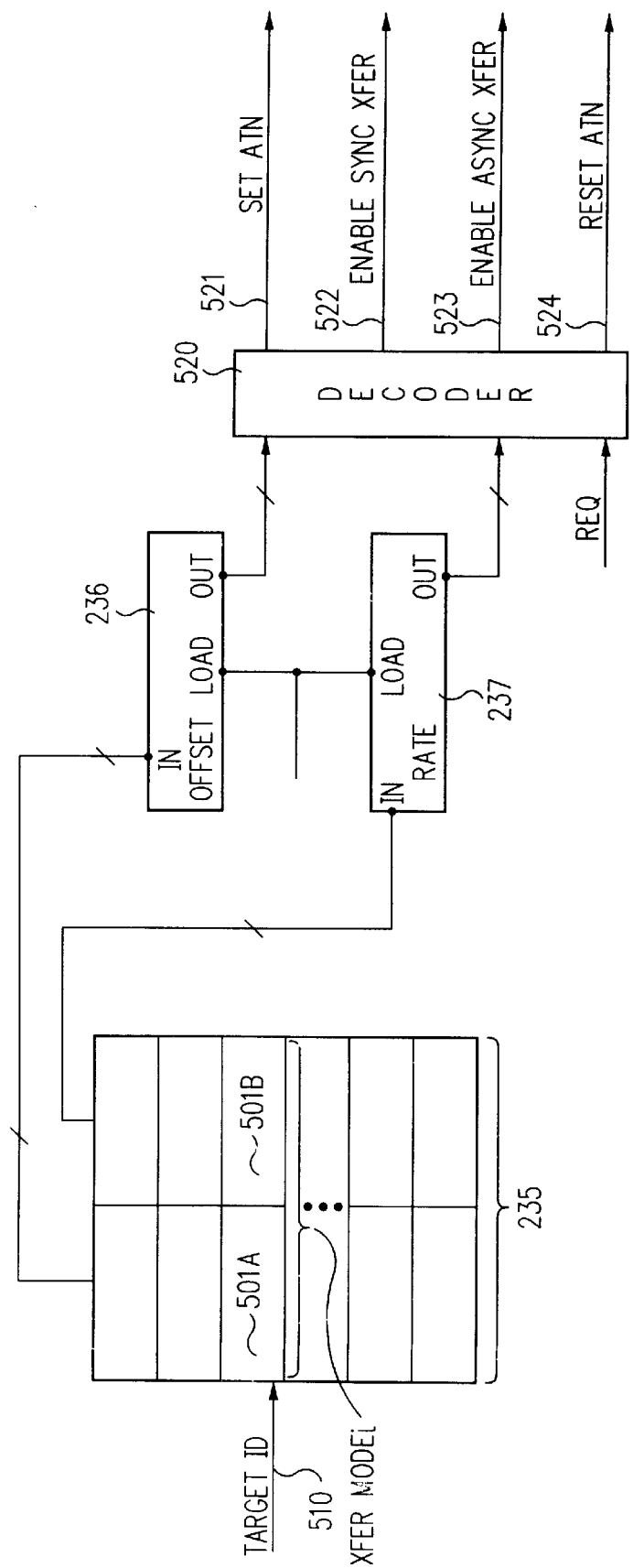
FIG. 5 is a more detailed diagram of the hardware structure of this invention.

In the embodiment of FIG. 5, decoder 520 performs operations 306 and 307 and drives an active signal on set SCSI attention signal line 521. In one embodiment, set SCSI attention signal line 521 is connected to set SCSI attention line in FIGS. 3A and 3B of copending, commonly filed, and commonly assigned U.S. patent application Ser. No. 09/344, 291, entitled "A Hardware Attention Management Circuit and Method for Parallel SCSI Host Adapters," of B. Arlen Young, the detailed description of which is incorporated herein by reference in its entirety.

Since selection or reselection has been completed, sequencer 220 is expecting a command phase on SCSI bus 250. However, the selected/reselected target device either responds to the active attention signal by sending an active request signal REQ and entering either a Message Out phase on SCSI bus 250, or the Command Phase on SCSI bus 250.

Hence, process 300 of this invention waits for assertion of the active request signal REQ in request check operation 312. Upon receipt of the active request signal, message out check operation 308 determines whether there is a Message Out Phase on SCSI bus 250. Check operation 308 is performed by sequencer 220 that is similar to that described in U.S. Pat. No. 5,838,950, which was cited above.

If a Message Out phase is detected, processing transfers from message out check operation 308 to interrupt driver operation 309. When sequencer 220 detects the unexpected Message Out phase, sequencer 220 interrupts host adapter driver 265 in operation 309 to have host adapter driver 265 handle the unexpected Message Out phase, and then pauses processing.

In process interrupt operation 310, host adapter driver 265 determines the reason that sequencer 220 generated the interrupt in operation 309. When host adapter driver 265 examines mirror SCSI data transfer parameter table 235A, host adapter driver 265 recognizes that a synchronous negotiation is required with the selected/reselected target device.

Host adapter driver 265 uses the Message Out phase to initiate a synchronous transfer parameter negotiation with the target device. Upon successful completion of the negotiation, host adapter driver 265 manually resets the active attention signal, and processing transfers to table update operation 311.

In table update table operation 311, host adapter driver 265 either writes the negotiated synchronous transfer parameters to the location in table 235 pointed to by target ID pointer 510, i.e., row XFERMODEi, and to the corresponding location in table 235A, or sets the second entry to indicate that synchronous negotiation is completed. For example, in the embodiment of FIG. 4B, host adapter driver 265 resets asynchronous transfer flag bit 403B and resets synchronous negotiation flag bit 404B if a synchronous transfer was negotiated.

Conversely, if a synchronous transfer was not successfully negotiated, host adapter driver 265 only resets synchronous negotiation flag bit 404B. Thus, the pending data transfer as well as any subsequent data transfers following a selection or reselection are performed using a synchronous data transfer if host adapter driver 265 successfully completed the negotiation and an asynchronous transfer otherwise. Finally, host adapter driver 265 manually resets the SCSI bus attention signal and unpauses sequencer 220 to complete update table operation 311.

Upon completion of operation 311, processing returns to automatic register load operation 303, which loads fields 501A and 501B that now contain either (i) the synchronous data transfer parameters or (ii) an asynchronous transfer parameter with a no synchronous negotiation parameter into registers 236 and 237, respectively. Assuming that synchronous negotiation was successful, operation 303 transfers to synchronous transfer check operation 304 that transfers to automatic synchronous data transfer operation 305 that was described above.

The above sequence of operations assumed that the target device responded with a Message Out phase when the SCSI attention signal was driven active, and so check operation 308 transferred to interrupt driver operation 309. However, if the target device ignores the active attention signal on SCSI bus 250 and enters the Command phase, the target device drives an active request signal REQ on SCSI bus 250. When a Message Out phase is not detected by operation 308, processing transfers to de-assert attention signal operation 313.

In operation 313, decoder 520 drives an active signal on enable SCSI asynchronous transfer line 523, and an active signal on reset SCSI attention signal line 524 in response to the active request signal REQ. In one embodiment, reset SCSI attention signal line 524 is connected to the attention reset line shown in FIGS. 3A and 3B of copending, commonly filed, and commonly assigned U.S. patent application Ser. No. 09/344,291, entitled "A Hardware Attention Management Circuit and Method for Parallel SCSI Host Adapters," of B. Arlen Young, the detailed description of which is incorporated herein by reference in its entirety. As described in that application, an active signal level on line 524 results in an automatic de-assertion of the active attention signal on SCSI bus 250.

Hence, the active signal on reset SCSI attention signal line 524 automatically resets the attention signal on SCSI bus 250. Processing is transferred from operation 313 to automatic asynchronous transfer operation 314.

In asynchronous transfer operation 314, SCSI cell performs an automatic asynchronous transfer over SCSI bus 250. The hardware necessary to perform an automated asynchronous data transfer following configuration of the hardware is known to those of skill in the art and so is not considered further. See for example, U.S. Pat. No. 5,838,950. Upon completion of the asynchronous data transfer, processing returns to select/reselect check operation 302.

Figure 6A:
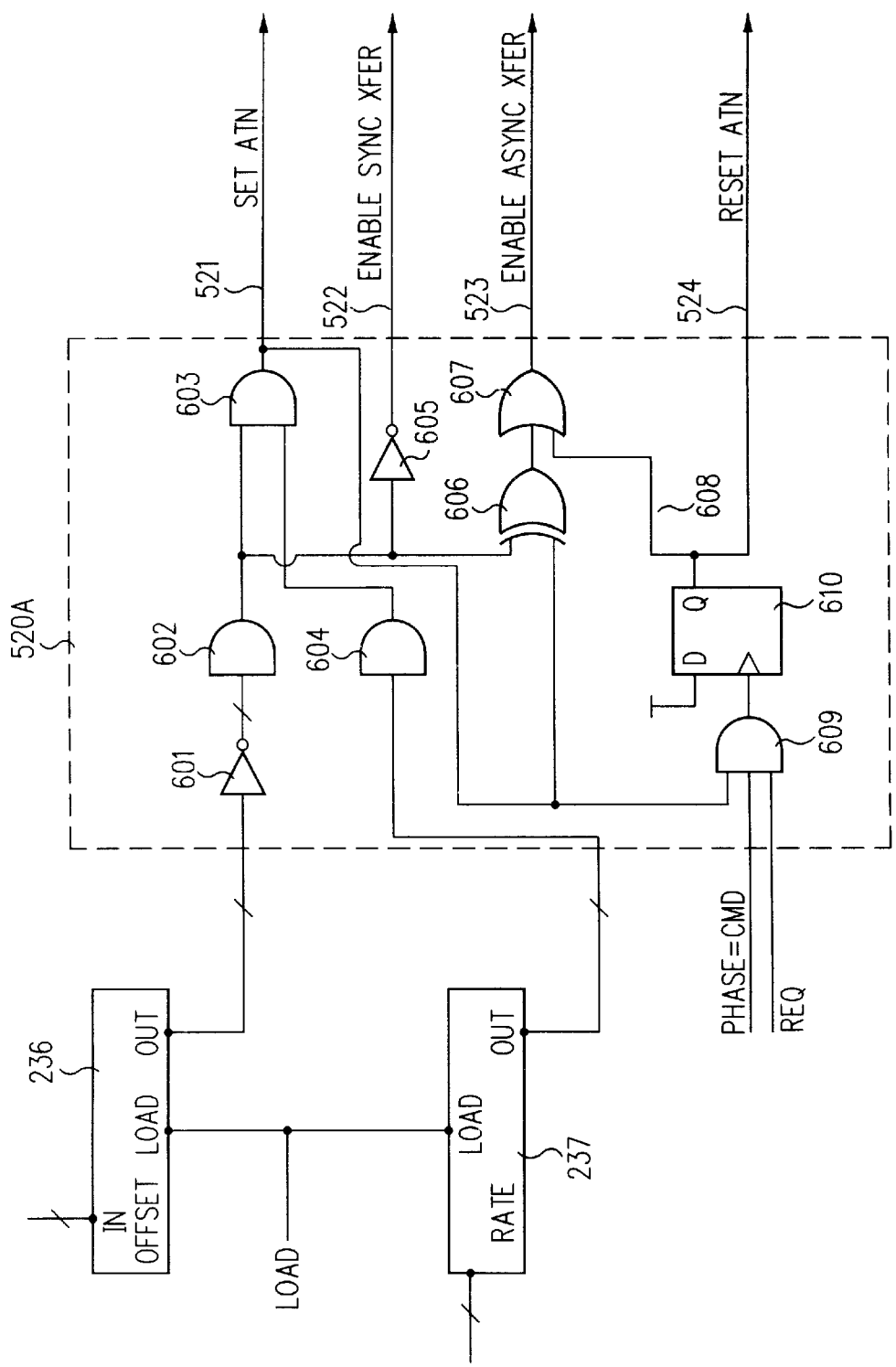
FIG. 6A is a more detailed diagram of one embodiment of the decoder circuit of this invention.

FIG. 6A is a more detailed diagram of decoder 520 for a table entry XFERMODEi as illustrated in FIG. 4A. In this embodiment, it is assumed that each bit in entry 401A has a zero value for an asynchronous transfer, and that each bit in entry 401A is set to a logic one when a synchronous negotiation is needed. These values are illustrative only and are not intended to limit the invention to only these specific values. In view of this disclosure, those of skill in the art can implement decoder 520 using values that are necessary for a particular application of this invention. Table 2 is a summary of the possible entries in registers 236 and 237.

TABLE 2

| Register 236 | Register 237 | Action |
| --- | --- | --- |
| All zeros | All ones | Asynchronous transfer with synchronous negotiation |
| All zeros | Any value other than all ones | Asynchronous transfer with no synchronous negotiation |
| Any non-zero value | Any value | Synchronous transfer |

The bits in register 236 each drive an inverter 601 that in turn drives an input terminal of AND gate 602. Thus, when register 236 contains all logic zeros, the output signal of AND gate 602 is a logic one and a logic zero otherwise.

Each bit in register 237 drives an input terminal of AND gate 604. Thus, when register 237 contains all logic ones, the output signal of AND gate 604 is a logic one and a logic zero otherwise. The output signal from AND gate 602 drives a first input terminal of AND gate 603 and the output signal of AND gate 604 drives a second input terminal of AND gate 603. The output signal of AND gate 603 drives set SCSI attention signal line 521. Hence, an active signal is driven on line 521 to automatically set the SCSI attention signal only when registers 236 and 237 are configured to indicate an asynchronous transfer with negotiation.

The output signal of AND gate 602 also drives inverter 605 that in turn drives enable SCSI synchronous transfer line 522. An active signal is driven on enable SCSI synchronous transfer line 522 whenever register 236 contains other than all zeros.

The output signal of AND gate 602 drives a first input terminal of an exclusive OR gate 606, and the output signal of AND gate 603 drives a second input terminal of exclusive OR gate 606. The output signal of exclusive OR gate 606 drives a first input terminal of an OR gate 607. The signal on the output terminal of OR gate 607 drives enable asynchronous transfer line 523.

If registers 236 and 237 contain values that indicate an asynchronous transfer with negotiation, both input signals to exclusive OR gate 605 are a logic one and so exclusive OR gate 605 drives a logic low signal on the input terminal of OR gate 607. With this configuration, a SCSI attention signal is automatically driven active as described above.

If the target device ignores the active attention signal, and issues an active request signal REQ followed by a command phase, active request signal REQ drives a first input terminal of AND gate 609. A second input terminal of AND gate 609 is connected to a line that carries an active signal only when the SCSI bus phase is the command phase. A third input terminal of AND gate 609 is driven by the output signal from AND gate 603. Thus, AND gate 609 only generates a logic one signal when the SCSI attention signal has been set using line 521, and an active request signal is received from the target device followed by a command phase, i.e., the target device ignored the active attention signal and entered the command phase.

The active signal from AND gate 609 clocks a D-type flip-flop 610 with the D input terminal connected to the power supply voltage. Hence, a logic one output signal is driven on output terminal Q of flip-flop 610 that in turn drives a second input terminal of OR gate 607 and a reset SCSI attention signal line 524. Thus, when the SCSI attention signal is set by the active signal on line 521 and an active request signal REQ is received followed by a command phase on SCSI bus 250, the SCSI attention signal is reset and an asynchronous transfer is enabled.

The decoding of signals on control bus CNTL of SCSI bus 250 to determine the SCSI bus phase, e.g., the command phase, is well known to those of skill in the art and so is not considered further. See for example, Peter M. Ridge, *The Book of SCSI, A Guide for Adventurers,* Chapter 6, pp. 85 to 122, No Starch Press, Daly City, Calif. (1995), which is incorporated herein by reference as an example of the knowledge of one of skill in the art.

If the value in register 236 indicates an asynchronous transfer and the value in register 237 indicates that no synchronous negotiation is needed, the output signal from AND gate 602 is a logic one, but the output signal from AND gate 603 is a logic zero. In this case, exclusive OR gate 606 generates a logic one output signal that is passed through OR gate 607 to asynchronous enable line 607.

Figure 6B:
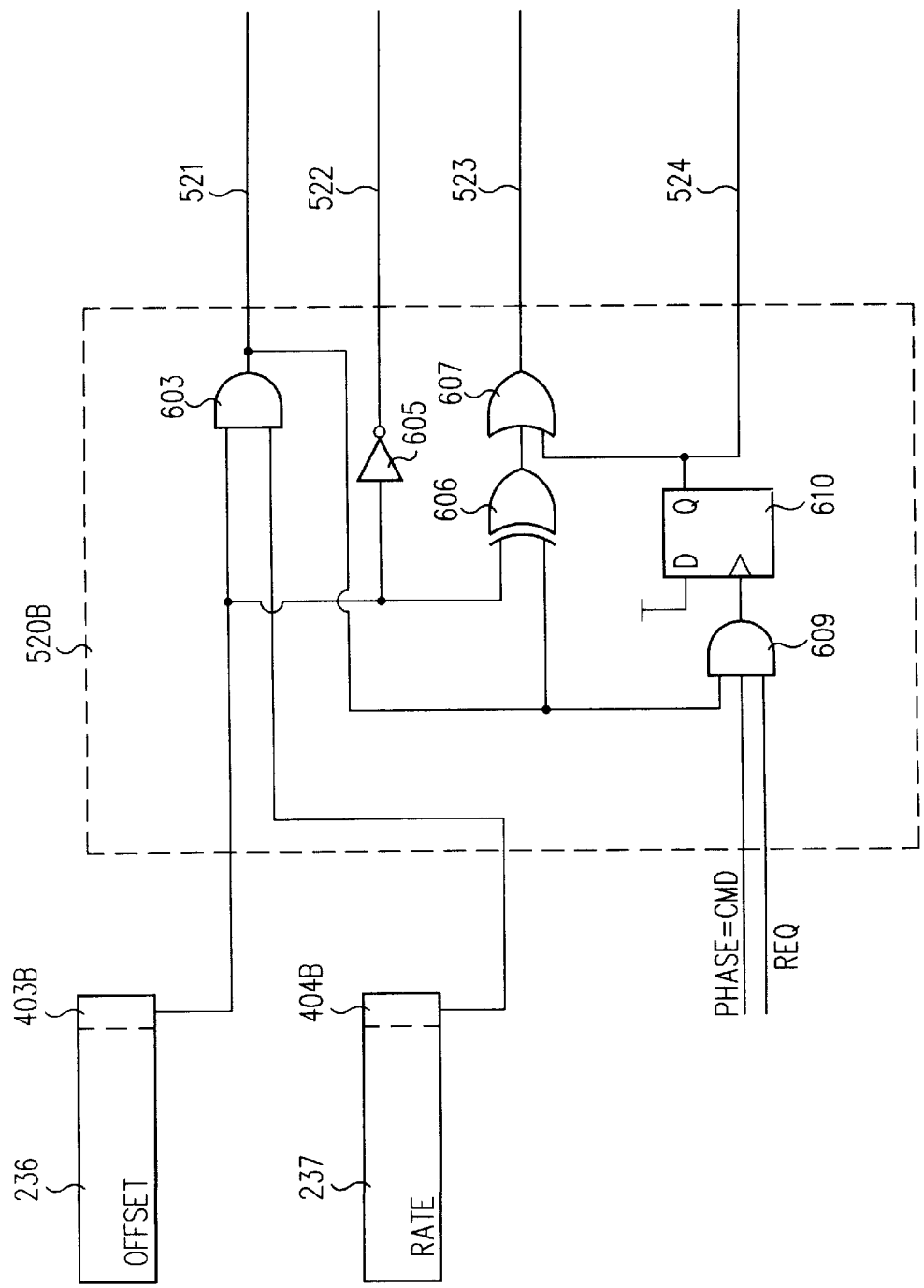
FIG. 6B is a more detailed diagram of a second embodiment of the decoder circuit of this invention.

Thus, decoder 520A is one hardware embodiment that supports the operations in process flow diagram 300. Another, hardware embodiment of decoder 520 for table entries XFERMODEi as illustrated in FIG. 4B is presented in FIG. 6B. Since only a single flag bit is used in register 236 and 237, as described above, elements 601, 602 604 in decoder 520A are unnecessary. The other elements in encoder 520B are the same as in encoder 520A and operate in a similar manner. Therefore, the above description is incorporated herein by reference.

The above embodiments of the invention are illustrative only of the principles of this invention are not intended to limit the invention to the particular examples presented.

I claim:

1. In a parallel SCSI host adapter integrated circuit, a hardware structure comprising:

a target identification register wherein a value in said target identification register is a target identification for a device on a SCSI bus a memory coupled to said target identification register;

a table, stored in said memory, having a plurality of entries wherein each entry in said plurality of entries is a parameter used to automatically configure said parallel SCSI host adapter integrated circuit for a data transfer over said SCSI bus with one target device; and a SCSI transfer parameter register coupled to said memory wherein an entry in said plurality of entries pointed to by said value in said target identification register is loaded automatically into said SCSI transfer parameter register without intervention of any processor.

2. The hardware structure of claim 1 further comprising:

another SCSI transfer parameter register coupled to said memory wherein another entry in said plurality of entries pointed to by said value stored in said target identification register is loaded automatically into said another SCSI transfer parameter register without intervention of any processor.

3. The hardware structure of claim 2 wherein said entry is a SCSI synchronous REQ/ACK offset.

4. The hardware structure of claim 3 wherein said another entry is a SCSI synchronous transfer period.

5. The hardware structure of claim 2 wherein said entry is a flag that has a first state for a SCSI synchronous transfer and a second state for a SCSI asynchronous transfer.

6. The hardware structure of claim 5 wherein said another entry is another flag that has a first state when a SCSI synchronous transfer negotiation is needed and a second state otherwise.

7. The hardware structure of claim 1 wherein said entry is a SCSI synchronous REQ/ACK offset.

8. The hardware structure of claim 1 wherein said entry is a flag that has a first state for a SCSI synchronous transfer and a second state for a SCSI asynchronous transfer.

9. The hardware structure of claim 1 further comprising:

a decoder circuit connected to said SCSI transfer parameter register, and having a set SCSI attention signal output line.

10. The hardware structure of claim 9 wherein said decoder circuit further comprises a reset SCSI attention signal output line.

11. The hardware structure of claim 9 wherein said decoder circuit further comprises a synchronous transfer enable line.

12. The hardware structure of claim 9 wherein said decoder circuit further comprises an asynchronous transfer enable line.

13. A method for automatically configuring a parallel SCSI host adapter integrated circuit for data transfers over a SCSI bus, said method comprising:

storing a table in a memory in said parallel SCSI host adapter integrated circuit wherein said table includes a plurality of entries where each entry in said plurality includes a field that is at least one parameter for a data transfer over a SCSI bus to a target device;

pointing to one entry in said plurality of entries wherein said one entry is the entry corresponding to a target identification of one target device on said SCSI bus in a target identification register; and loading said field in said one entry pointed to automatically, without any processor intervention, in a register used in configuring said parallel SCSI host adapter integrated circuit for said data transfers over said SCSI bus to said one target device.

14. The method of claim 13 wherein said field contains a SCSI synchronous REQ/ACK offset.

15. The method of claim 13 wherein said field contains a SCSI synchronous transfer period.

16. The method of claim 13 wherein said field contains a flag that has a first state for a SCSI synchronous transfer and a second state for a SCSI asynchronous transfer.

17. The method of claim 13 wherein said field contains a flag that has a first state when a SCSI synchronous transfer negotiation is needed and a second state otherwise.

18. The method of claim 13 further comprising:

updating said one entry pointed to following a successful synchronous negotiation.

* * * * *